US010043182B1

(12) United States Patent
Bharghavan et al.

(10) Patent No.: US 10,043,182 B1
(45) Date of Patent: Aug. 7, 2018

(54) SYSTEM AND METHOD FOR USING CARDHOLDER CONTEXT AND PREFERENCES IN TRANSACTION AUTHORIZATION

(71) Applicant: Ondot Systems Inc, San Jose, CA (US)

(72) Inventors: Vaduvur Bharghavan, Morgan Hill, CA (US); Rajesh Gurumurthy, Chennai (IN); Rahul Paul, Bangalore (IN); Govardan Prasad, Bangalore (IN); Ramachandran Minakshi Sundaram, Bangalore (IN); Rachna Ahlawat, San Jose, CA (US)

(73) Assignee: Ondot System, Inc., San Jose, CA (US)

( * ) Notice: Subject to any disclaimer, the term of this patent is extended or adjusted under 35 U.S.C. 154(b) by 0 days.

(21) Appl. No.: 14/060,439

(22) Filed: Oct. 22, 2013

(51) Int. Cl.
  *G06Q 20/40* (2012.01)
(52) U.S. Cl.
  CPC .................................. *G06Q 20/40* (2013.01)
(58) Field of Classification Search
  CPC ...... G06Q 20/40; G06Q 20/20; G06Q 20/405; G06Q 20/04; G06Q 30/06; G06Q 20/12
  USPC .......... 705/44, 39, 21, 19, 14.23, 40, 37, 38, 705/26.41, 14.22, 14.65; 340/5.4, 572.1; 235/380, 385; 455/456.3; 342/450; 707/774, 769; 718/102; 717/124
  See application file for complete search history.

(56) References Cited

U.S. PATENT DOCUMENTS

| 5,708,422 | A | | 1/1998 | Blonder | |
|---|---|---|---|---|---|
| 5,884,289 | A | * | 3/1999 | Anderson | G06Q 20/105 235/380 |
| 5,953,710 | A | | 9/1999 | Fleming | |
| 6,029,154 | A | * | 2/2000 | Pettitt | G06Q 20/027 705/38 |
| 6,122,624 | A | * | 9/2000 | Tetro | G06Q 20/04 705/44 |
| 6,343,279 | B1 | * | 1/2002 | Bissonette | G06Q 20/10 235/380 |
| 6,422,462 | B1 | | 7/2002 | Cohen | |
| 6,505,168 | B1 | * | 1/2003 | Rothman | G06Q 30/02 705/14.1 |

(Continued)

OTHER PUBLICATIONS

Anonymous, General ISO-8583 Credit Card (GICC) Protocol for POS Authorization, American Express Payment Services Ltd., B+S Card Service GmbH, ConCardis, Elavon Merchant Services, Version 4.14e/Date 30/06/2010/Status Issue.*

(Continued)

*Primary Examiner* — Tien C Nguyen

(57) ABSTRACT

A method and system for processing a payment authorization request associated with a payment card is provided. The method comprises determining a cardholder's context based on transmissions received from a user device associated with a cardholder using the payment card; determining a transaction context based on analysis of the payment authorization request; determining at least one transaction authorization preference associated with the payment card; performing a transaction authorization process to generate a transaction authorization response based on the at least one transaction authorization preference wherein information in the transaction context is used as a hint to selectively guide application of the transaction authorization preference.

16 Claims, 6 Drawing Sheets

(56) References Cited

U.S. PATENT DOCUMENTS

| | | | |
|---|---|---|---|
| 6,516,056 B1 | 2/2003 | Justice | |
| 6,988,657 B1* | 1/2006 | Singer | G06Q 20/0855 235/380 |
| 7,427,033 B1 | 9/2008 | Roskind | |
| 7,784,684 B2 | 8/2010 | Labrou et al. | |
| 7,793,851 B2 | 9/2010 | Mullen | |
| 7,798,416 B2 | 9/2010 | Roskind | |
| 7,801,826 B2 | 9/2010 | Labrou et al. | |
| 7,813,725 B2 | 10/2010 | Celik | |
| 7,822,688 B2 | 10/2010 | Labrou et al. | |
| 7,828,220 B2 | 11/2010 | Mullen | |
| 8,025,220 B2* | 9/2011 | Blume | G06Q 20/04 235/375 |
| 8,127,982 B1 | 3/2012 | Casey | |
| 8,396,888 B2* | 3/2013 | Cheng | G06F 17/3087 707/774 |
| 8,442,894 B2* | 5/2013 | Blackhurst | G06Q 30/0239 705/35 |
| 8,583,593 B1* | 11/2013 | Achanta | G06F 17/30442 707/602 |
| 8,706,620 B2 | 4/2014 | Ciurea | |
| 8,788,324 B1* | 7/2014 | Shetty | G06Q 30/0601 705/14.1 |
| 8,818,909 B2* | 8/2014 | Bosworth | G06Q 30/02 705/14.57 |
| 9,037,589 B2* | 5/2015 | Anderson | G06F 17/30286 707/737 |
| 9,324,105 B2 | 4/2016 | Kopikare | |
| 2002/0035539 A1* | 3/2002 | O'Connell | G06Q 20/02 705/39 |
| 2002/0082995 A1* | 6/2002 | Christie, IV | G06Q 20/085 705/44 |
| 2002/0111886 A1 | 8/2002 | Chenevich et al. | |
| 2002/0123938 A1 | 9/2002 | Yu | |
| 2002/0152123 A1* | 10/2002 | Giordano | G06Q 20/04 705/14.33 |
| 2002/0194141 A1 | 12/2002 | Langensteiner | |
| 2002/0198806 A1 | 12/2002 | Blagg | |
| 2003/0028481 A1 | 2/2003 | Flitcroft | |
| 2004/0039694 A1 | 2/2004 | Dunn | |
| 2004/0068653 A1 | 4/2004 | Fascenda | |
| 2004/0093268 A1* | 5/2004 | Ramchandani | G06Q 30/02 705/14.13 |
| 2004/0128243 A1 | 7/2004 | Kavanagh | |
| 2005/0097019 A1 | 5/2005 | Jacobs | |
| 2005/0102243 A1 | 5/2005 | Kinsella | |
| 2005/0240527 A1* | 10/2005 | Goldman | G06Q 20/04 705/44 |
| 2005/0268003 A1 | 12/2005 | Wang | |
| 2006/0078986 A1* | 4/2006 | Ly | B01L 3/5023 435/287.2 |
| 2006/0085337 A1 | 4/2006 | Conforti et al. | |
| 2006/0178986 A1* | 8/2006 | Giordano | G06Q 20/04 705/40 |
| 2007/0039049 A1 | 2/2007 | Kupferman et al. | |
| 2007/0124256 A1 | 5/2007 | Crooks et al. | |
| 2008/0035724 A1* | 2/2008 | Vawter | G06Q 20/20 235/380 |
| 2008/0052226 A1* | 2/2008 | Agarwal | G06F 17/277 705/39 |
| 2008/0101283 A1 | 5/2008 | Calhoun et al. | |
| 2008/0120235 A1* | 5/2008 | Chu | G06Q 20/40 705/44 |
| 2008/0133336 A1* | 6/2008 | Altman | G06Q 30/0207 455/456.1 |
| 2008/0147523 A1 | 6/2008 | Mulry et al. | |
| 2008/0228648 A1 | 9/2008 | Kemper | |
| 2008/0256044 A1* | 10/2008 | Anderson | G06F 17/3087 |
| 2008/0257952 A1 | 10/2008 | Zandonadi | |
| 2008/0263402 A1 | 10/2008 | Braysy | |
| 2009/0112651 A1 | 4/2009 | Atkinson | |
| 2009/0132424 A1* | 5/2009 | Kendrick | G06Q 20/20 705/75 |
| 2009/0138968 A1 | 5/2009 | Serber | |
| 2009/0164327 A1* | 6/2009 | Bishop | G06Q 20/02 705/19 |
| 2009/0164330 A1* | 6/2009 | Bishop | G06Q 20/02 705/19 |
| 2009/0182728 A1* | 7/2009 | Anderson | G06F 17/30522 |
| 2009/0254462 A1* | 10/2009 | Tomchek | G06Q 20/24 705/30 |
| 2009/0313147 A1 | 12/2009 | Balasubramanian | |
| 2010/0051684 A1 | 3/2010 | Powers | |
| 2010/0063903 A1 | 3/2010 | Whipple et al. | |
| 2010/0065632 A1* | 3/2010 | Babcock | G06Q 10/08 235/385 |
| 2010/0106611 A1* | 4/2010 | Paulsen | G06Q 20/10 705/26.1 |
| 2010/0114776 A1* | 5/2010 | Weller | G06F 21/31 705/44 |
| 2010/0153224 A1 | 6/2010 | Livnat | |
| 2010/0274720 A1* | 10/2010 | Carlson | G06Q 20/202 705/44 |
| 2010/0325047 A1* | 12/2010 | Carlson | G06Q 20/04 705/44 |
| 2011/0066504 A1* | 3/2011 | Chatow | G06Q 30/02 705/14.65 |
| 2011/0137881 A1* | 6/2011 | Cheng | G06F 17/3087 707/706 |
| 2011/0238564 A1 | 9/2011 | Lim et al. | |
| 2011/0251892 A1 | 10/2011 | Laracey | |
| 2012/0030109 A1 | 2/2012 | Dooley Maley | |
| 2012/0036013 A1 | 2/2012 | Neuhaus | |
| 2012/0059758 A1 | 3/2012 | Carlson | |
| 2012/0072347 A1* | 3/2012 | Conway | G06Q 20/04 705/44 |
| 2012/0095918 A1* | 4/2012 | Jurss | G06Q 20/40 705/44 |
| 2012/0143730 A1 | 6/2012 | Ansari et al. | |
| 2012/0197708 A1 | 8/2012 | Mullen et al. | |
| 2012/0197802 A1* | 8/2012 | Smith | G06Q 20/12 705/44 |
| 2012/0225639 A1 | 9/2012 | Gazdzinski | |
| 2012/0271697 A1* | 10/2012 | Gilman | G06Q 20/387 705/14.23 |
| 2012/0303525 A1* | 11/2012 | Sahadevan | G06Q 20/405 705/44 |
| 2013/0138516 A1* | 5/2013 | White | G06Q 20/204 705/16 |
| 2013/0282593 A1 | 10/2013 | Merz et al. | |
| 2013/0290121 A1* | 10/2013 | Simakov | G06Q 20/3572 705/21 |
| 2013/0332361 A1* | 12/2013 | Ciurea | G06Q 20/405 705/44 |
| 2013/0332362 A1* | 12/2013 | Ciurea | G06Q 20/383 705/44 |
| 2013/0346294 A1 | 12/2013 | Faith | |
| 2014/0040135 A1* | 2/2014 | Ovick | G06Q 20/3825 705/44 |
| 2014/0095947 A1 | 4/2014 | Mozak | |
| 2014/0144979 A1* | 5/2014 | Lyman | G06Q 30/0282 235/375 |
| 2014/0258119 A1* | 9/2014 | Canis | G06Q 20/12 705/44 |
| 2014/0304055 A1* | 10/2014 | Faith | G06Q 20/40145 705/14.26 |
| 2014/0358769 A1* | 12/2014 | Howe | G06Q 20/12 705/39 |
| 2015/0242949 A1 | 8/2015 | Phillips, IV | |

OTHER PUBLICATIONS

"Sniffing Tutorial part 1—intercepting Network Traffic", NETRESEC Network Security Blog. Web. , Mar. 11, 2011. http://www.netresec.com/?page=Blog&month=2011-03&post=Sniffing-Tutorial-part-1---Intercepting-Network-Traffic.

"Sniffing Tutorial part 1—intercepting Network Traffic", NETRESEC Network Security Blog. Web., Mar. 11, 2011. http://

(56) References Cited

OTHER PUBLICATIONS www.netresec.com/?page=Blog&month=2011-03&post=Sniffing-Tutorial-part-1-Intercepting-Network-Traffic.

* cited by examiner

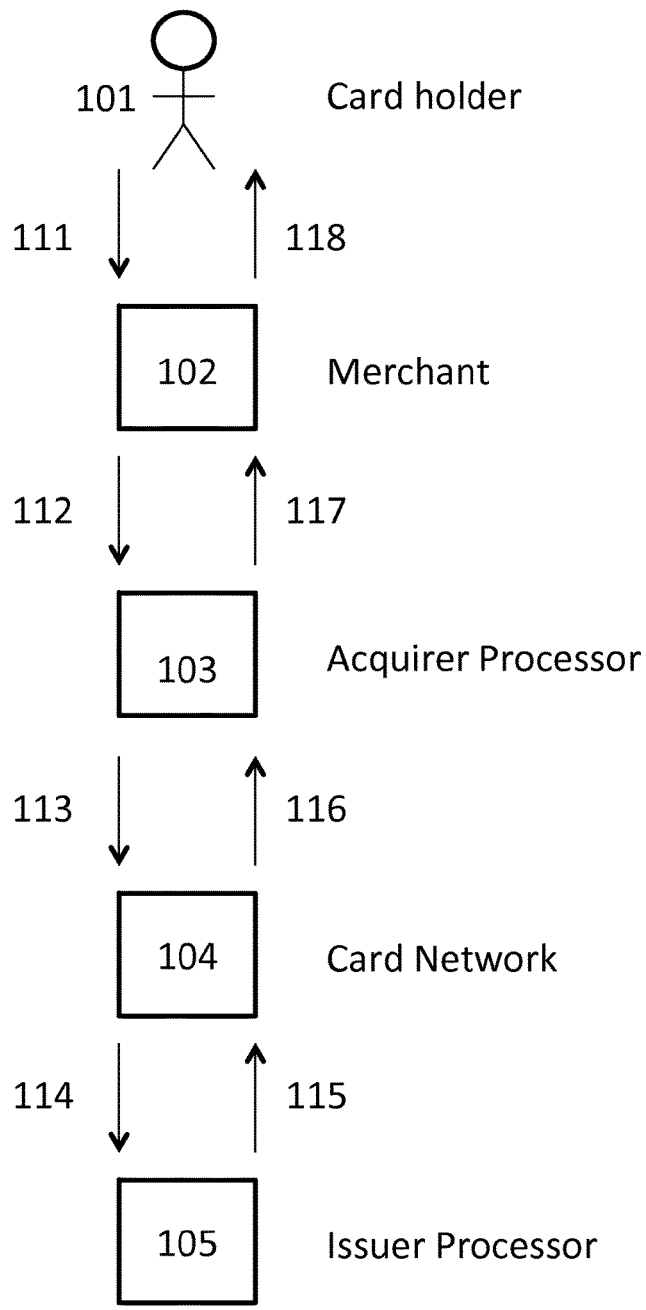
Figure 1: Existing Method for Payment Authorization

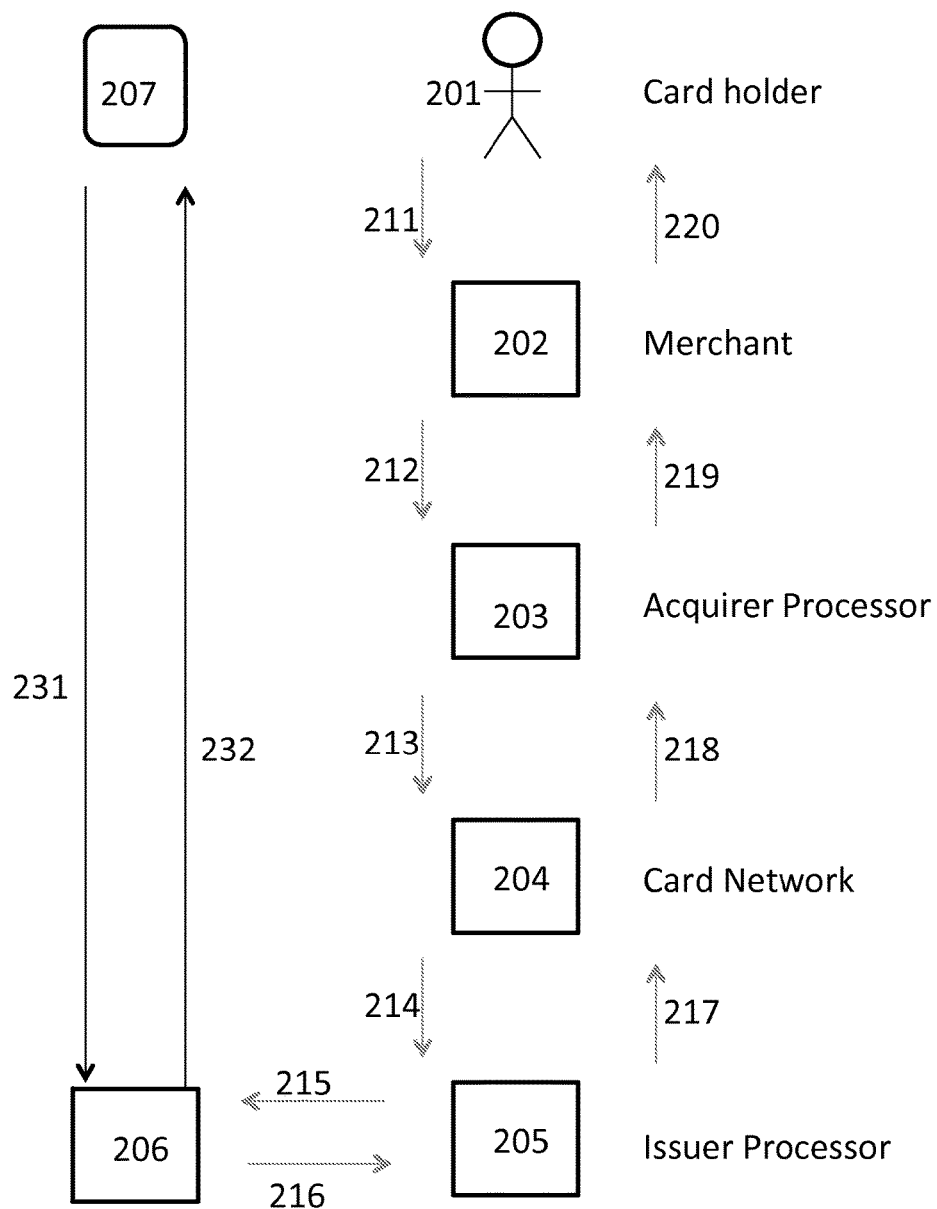
Figure 2: User Context and Preferences in Payment Authorization

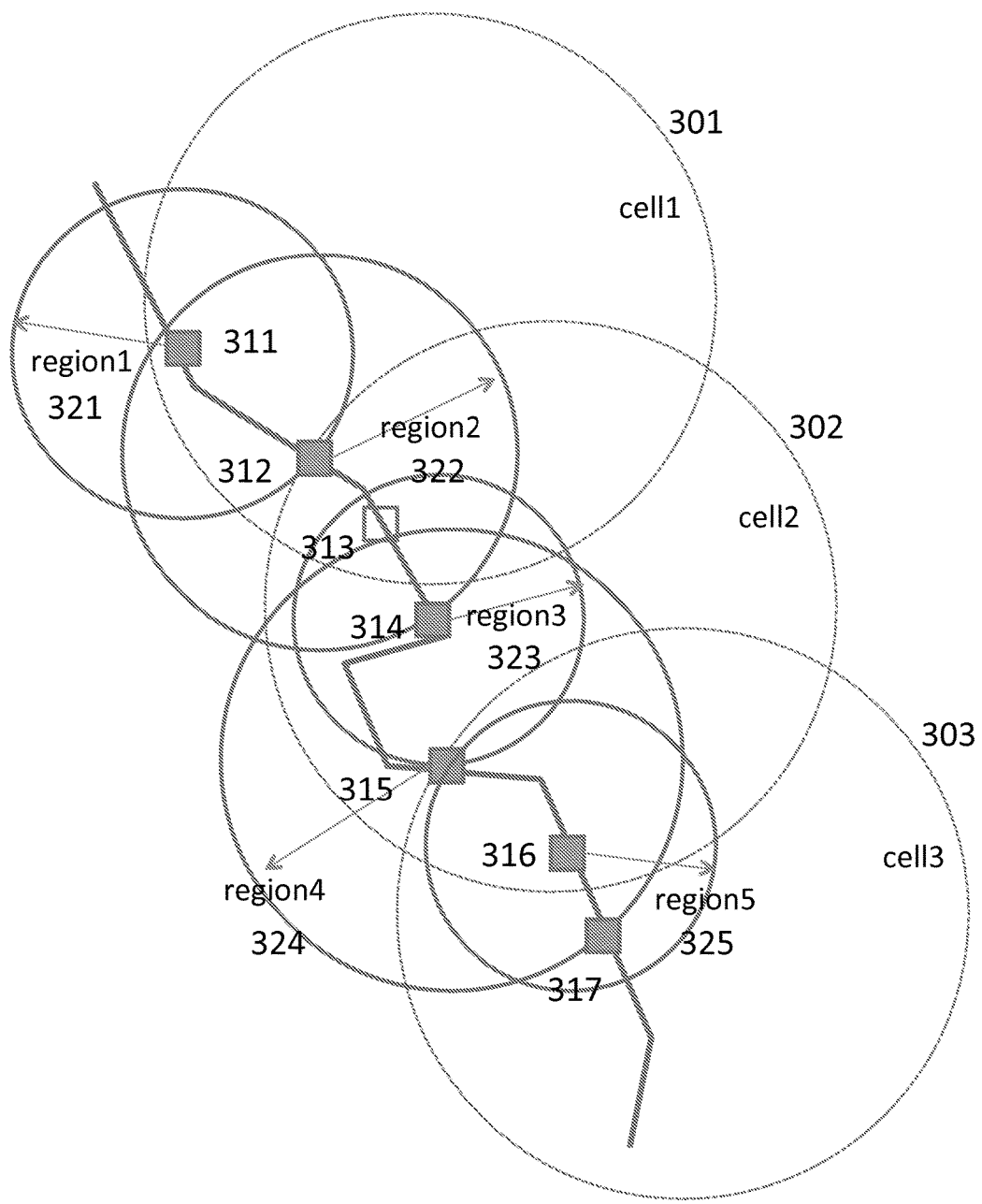
Figure 3: Device Location Update

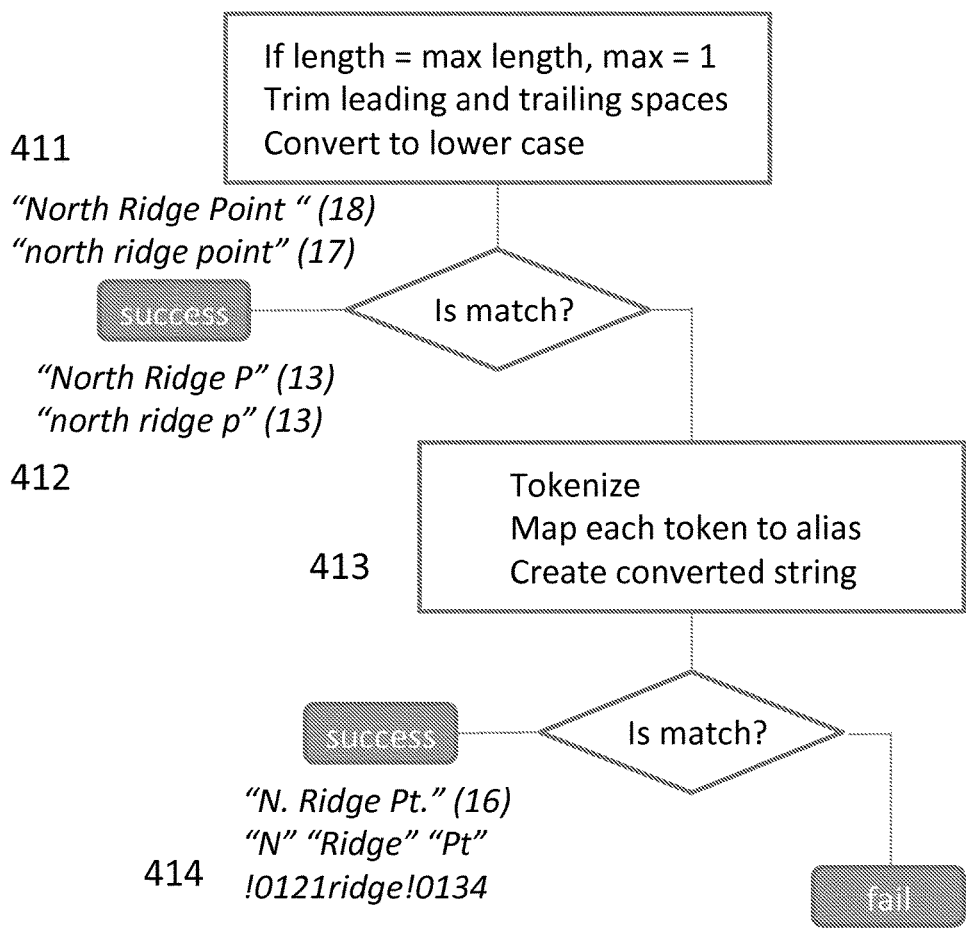
Figure 4: Merchant City to Location

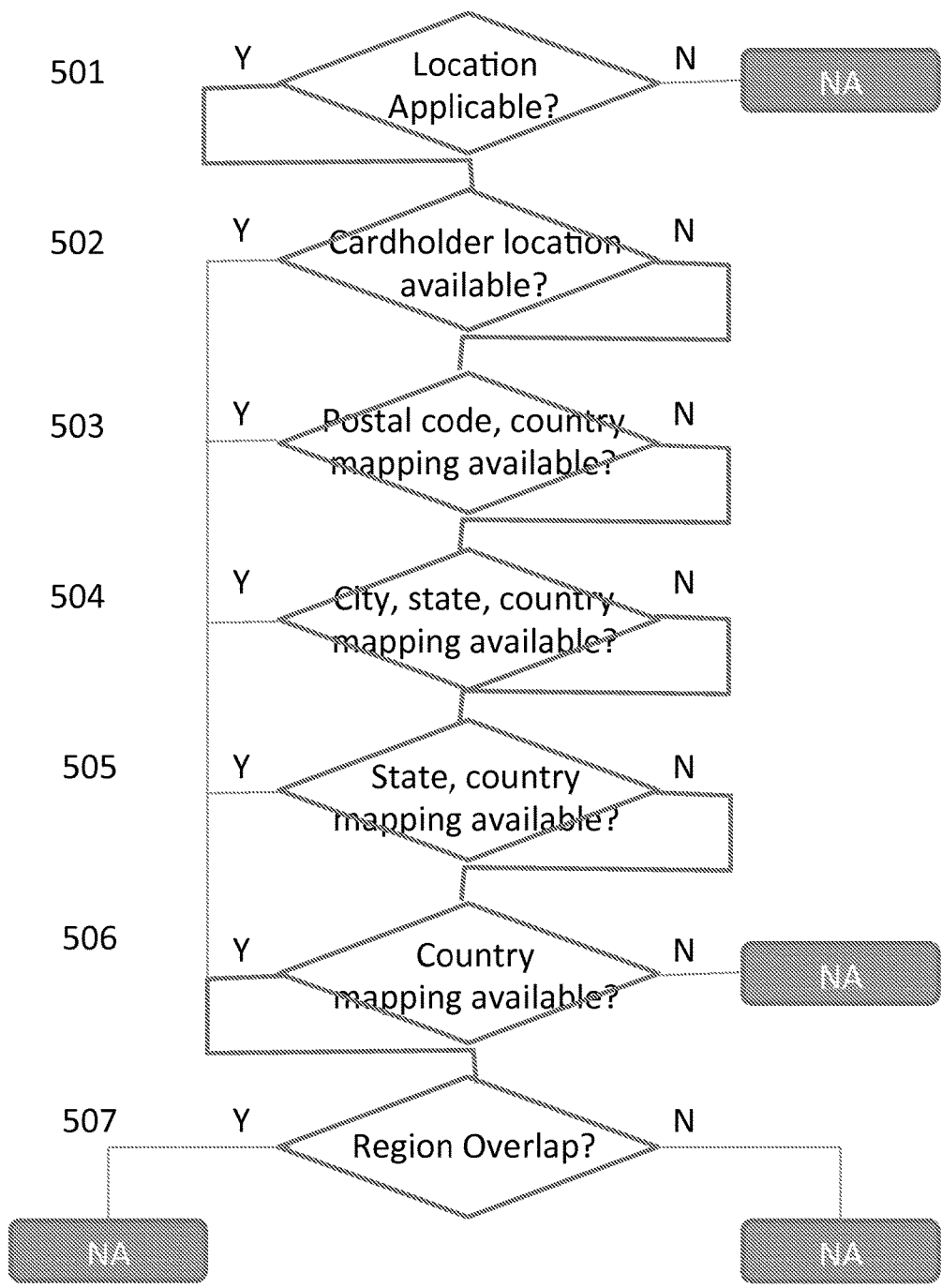
Figure 5: Location Match Algorithm

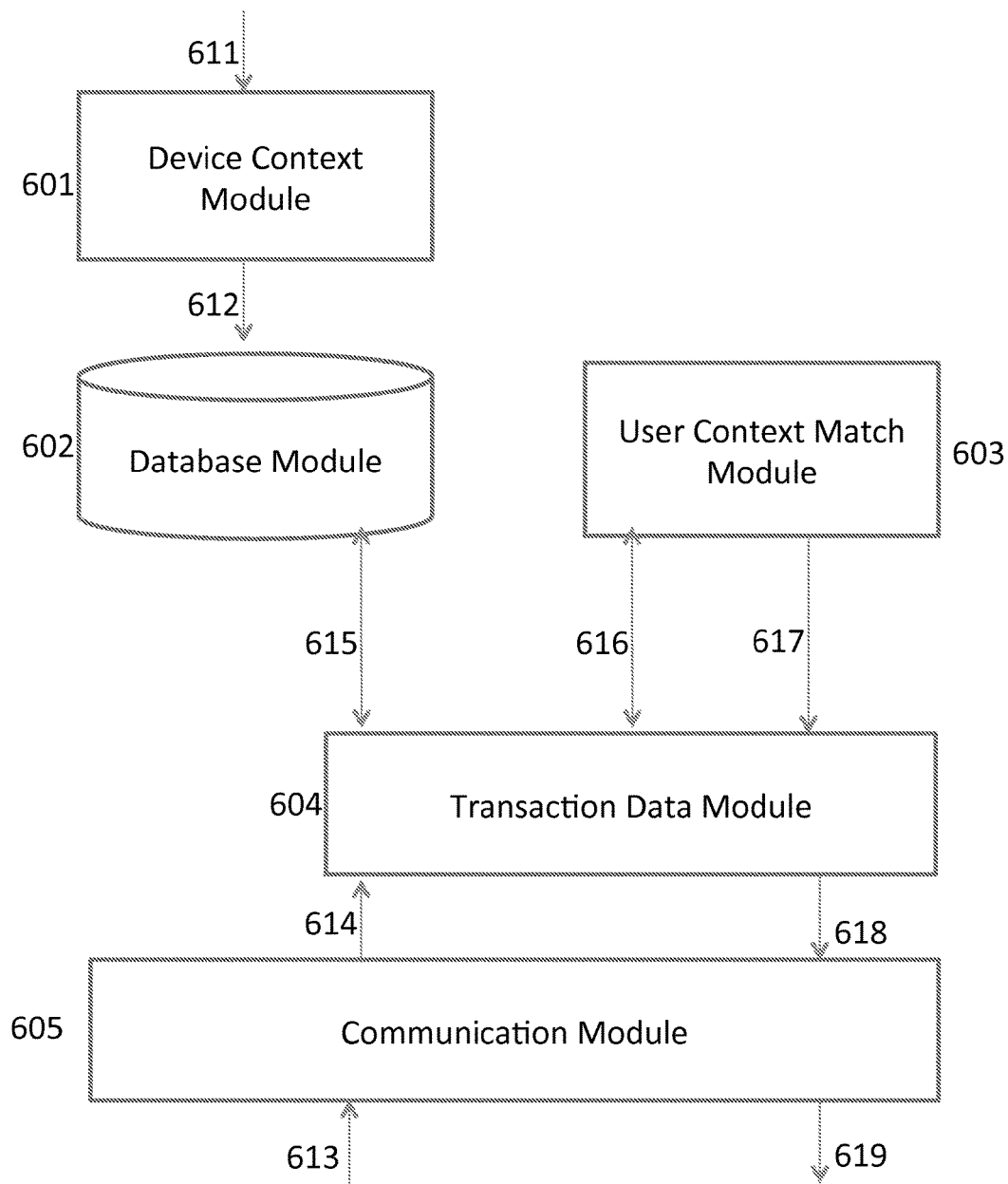
Figure 6: Context Computing Logic – Location Example

SYSTEM AND METHOD FOR USING CARDHOLDER CONTEXT AND PREFERENCES IN TRANSACTION AUTHORIZATION

FIELD

Embodiments of the invention relate generally to payment systems. More particularly, embodiments of the invention relate to systems and methods for payment transaction authorization.

BACKGROUND

Payment cards allow cardholders to make financial transactions without exchanging cash. A payment card is typically tied to an account, with an associated spending limit that is secured either by cardholder funds or by credit from a card-issuing financial institution.

In a typical payment card transaction, a cardholder presents the payment card information to a merchant (via a card reader or online), who then initiates a transaction authorization via the merchant's financial institution processor (i.e. acquirer processor) to the cardholder's financial institution processor (i.e. issuer processor).

The issuer processor conducts a series of checks that may include one or more of the following: validation of the transaction request format, validation of requesting merchant, fraud checks, compliance of the payment card with pre-defined card usage rules, and availability of funds in the cardholder's account. The examples above are neither comprehensive nor limiting. If all the checks pass satisfactorily, the issuer processor authorizes the transaction request. The transaction authorization allows the exchange of goods/services between the merchant and the cardholder to proceed, with the reconciliation and actual transfer of funds happening either concurrently, or at a later time. Card networks allow different acquirer and issuer processors to communicate with each other in "open loop" communications, while the acquirer and issuer processor either are typically the same or tied to each other via peer relationships in "closed loop" communications.

SUMMARY

This Summary is provided to comply with 37 C.F.R. § 1.73, requiring a summary of the invention briefly indicating the nature and substance of the invention. It is submitted with the understanding that it will not be used to interpret or limit the scope or meaning of the claims.

Embodiments of the present invention provide systems and methods for obtaining a cardholder context and at least one payment card preference, the cardholder context and each payment card preference being associated with a payment card used to initiate a payment authorization request, and then applying the cardholder context and each payment card preference to influence an outcome of the payment authorization request in a transaction authorization process.

In one embodiment of the invention, a computing system maintains payment card preferences and cardholder context. The computing system provides interfaces for cardholders, card-owners, or their delegates to enter payment card preferences that are applied during a transaction authorization process.

In one embodiment, the computing system provides interfaces whereby configured devices or applications can update payment card context periodically or on-demand.

In one embodiment, the computing system provides interfaces whereby an authorization system can retrieve payment card preferences and cardholder context which may be applied during the transaction authorization.

In one embodiment of the invention, payment card preferences are provided by cardholders.

In another embodiment of the invention, payment card preferences are provided by card owners, on behalf of cardholders. Card owner preferences are prioritized over cardholder preferences, thereby providing a mechanism for card owners to control cardholder purchase behavior.

In another embodiment of the invention, payment card preferences are provided by delegates of either cardholders or card owners.

In one embodiment of the invention, a cardholder uses an application to send periodic context updates including, but not limited to, geographical location, reachability via different networks, etc. These updates are sent in the background, without requiring explicit cardholder intervention.

In another embodiment of the invention, a cardholder may elect to install the application on multiple devices and provide context updates from one or more devices.

In another embodiment of the invention, multiple cardholders may use the same device, sending same, different, or overlapping context information, without limitation.

In another embodiment of the invention, a cardholder initiates context updates, for example when initiating travel. In this embodiment, cardholder explicitly provides context information to the computing system.

In another embodiment of the invention, the cardholder notifies the server that he is going to make one or more purchases, with approximate information including one or more among transaction type, merchant type, merchant name, location, amount range, number of transactions, and location. In this case, the cardholder explicitly provides information about purchase context.

In another embodiment of the invention, the server requests the cardholder for cardholder context, including one or more among location, past few transactions, approximate number of transactions and spending in the recent past. In this case, the server requests the cardholder context in order to determine whether future transactions can be approved or denied.

Thus, according to different embodiments, cardholder context may be provided by a cardholder independently of any transaction and before the transaction is initiated or the in response to a notification that a transaction is denied. In the latter case, the notification may specify the reason for denying the transaction, e.g. the location of the transaction is outside a geo-fence set by the cardholder. Thus, the cardholder can respond to the notification providing his/her current location to override the geo-fence.

Preferences may be entered into the computing system via multiple devices, and used in series or contemporaneously, without limitation. Devices used for providing preferences and context may be distinct or same or comprise an overlapping subset.

In one embodiment of the invention, a computing system provides preferences and context associated with a payment card on request from a transaction authorization system.

In another embodiment of the invention, a computing system receives information regarding a transaction, applies cardholder preferences and context information to the transaction, and provides information back to the authorization system on whether the transaction is consistent with the cardholder preferences and context.

The present computing system that maintains cardholder preferences and context is distinct from a transaction authorization system, and the information provided by the computing system to the authorization system may be used in the authorization process or for recording historical information or other purposes without limitation.

Location Context

One instance of cardholder context is location.

Location may comprise of one or more of the following properties: latitude and longitude, city, state, postal code, country, geographical region.

Location may be provided from multiple devices associated with a cardholder or a payment card.

The following paragraphs describe one embodiment of cardholder preferences, wherein a cardholder or card owner or delegate specifies a rule that a payment card may only be used if the merchant is in the proximity of the cardholder.

A payment card is associated with one or more devices as specified by the cardholder or card owner or delegate. A location tracking mechanism, such as one described below but not limited to the described mechanism, allows a computing system to track the location of one or more devices.

When a transaction authorization request is initiated by a payment system, merchant information, including but not limited to city, state, country, and postal code, may be available; the transaction type, such as whether the cardholder is present at the point of payment, may be available; the merchant type, such as whether the merchant is of a specific merchant category, may be available; additional point-of-sale information, such as whether the point-of-sale terminal is co-located with the card acceptor facility, may be available.

Location-based authorization rules may be specified by an issuer processor or an individual financial institution, governing for which transactions location based context can be applied. For example, location context is applicable for a card-present customer-present transaction where merchant point-of-sale is at a card acceptor facility; for example, location context is not applicable for a card-not-present customer-not-present transaction.

For a transaction authorization, using location context and location preferences as example, there may be at least six possible outcomes of the applying authorization rules: (a) the payment card is not provisioned at the computing system; (b) the cardholder has not set location-based preferences; (c) location-based preferences are not applicable for this transaction; (d) location-based preferences did not match based on the cardholder location context and the merchant location; (e) there is inadequate information—either lacking sufficient cardholder location context or lacking sufficient merchant location context or both—to exercise preferences; and (f) location-based preferences matched based on the cardholder location context and the merchant location.

For all other types of cardholder context and cardholder preferences, similar outcomes apply.

The outcome of the application of location context and location preferences to a transaction is generated at the computing system. This outcome may be retrieved from the authorization system or may be delivered to the authorization system on demand. This outcome may be used for authorization or for logging or for post-authorization transaction alert.

In one embodiment of the invention, location context is updated from a device to the computing server. The location update may happen periodically, or on significant location change, or every time the device crosses a geographical boundary/region.

In one embodiment of the invention, the periodicity of the location update is governed by the computing server and may be a static configuration or may be dynamic adjusted using a variety of criteria.

In one embodiment of the invention, significant location change may be determined by the device operating system or may be initiated on specific criteria that are governed by the computing server.

In one embodiment of the invention, geo-fences that are dynamically updated based on user's current location or proximity to merchants or other criteria established by the server, are governed by the server.

Any combination of location change criteria may be used, without limitation. The application of these criteria, as well as the parameters for each of the criteria, are governed by the computing server and delivered to the device—either statically or at pre-configured times or dynamically or any combination thereof.

In one embodiment of the invention, the computing server optimizes criteria for location updates from the device that include the following: (a) adapt the geographic region based on the speed of motion of the device in order to keep the frequency of location update invariant to the speed of motion, (b) adapt the periodicity of the location updates based on speed of motion and last significant update in order to address sudden changes in speed of motion, (c) record geographical location on the device every time a location update is sent to the server in order to bound the frequency of location update, (d) adapt when location updates are sent to server based on recent frequency and location of updates, and (e) eliminate location samples that are either too old or too inaccurate. When the device sends location updates to the server, the server may update with updated criteria for future location updates from the device.

The end result of the above techniques is that the computing server receives location updates from registered devices and is able to heuristically estimate the location of the device at the time of transaction authorization. Location may include one or more of the following: latitude, longitude, city, state, postal code, country. Additional information such as the method of arriving at the location, the confidence level, etc. may also be included in the location context of the device.

When a transaction authorization occurs, in typical open loop network payment standards in effect today, merchant information is often present. Merchant information, particularly for card present transactions, may include postal code, city, state, and country. Additionally, for some transactions and some networks, merchant information may include street address. Additionally, for certain types of transactions, such as ATM transactions, merchant information may include a specific terminal ID, which can be translated to a specific merchant location by mapping a terminal ID to a location.

There are no mandatory specifications or rules that govern merchant information. For example, the same city, New York City, may be identified as "New York", "NYC", "New York City", etc. The present invention specifies techniques for mapping merchant location to a geographical location.

For each postal code, the computing server maintains a database that maps the postal code to a geographical region.

For each country, the computing server maintains a database that maps the country to a geographical region.

For each state in each country, the computing server may maintain a database that maps the state to a geographical region. In some embodiments of the invention, state database may exist only for some countries.

For each city in each country, the computing server may maintain a database that maps the city to a geographical region. In some embodiments of the invention, city database may exist only for some countries.

For each postal code in each country, the computing server may maintain a database that maps the postal code to a geographical region. In some embodiments of the invention, postal code database may exist only for some countries.

When receiving a transaction authorization, the computing server generates the best restriction of geographical region for the merchant given the merchant information.

For mapping merchant city information in the transaction authorization to a known city name, where possible, (a) the computing server first checks if the city name maps to a known database. (b) If not, the computing server generates a set of "tokens" from the merchant city information, where each token is an alphanumeric substring of the merchant city information. (c) The concatenation of tokens results in the merchant city information excluding all non alphanumeric characters. Each token is then mapped to a canonical token where possible. For example, "N" and "North" both map to the token "!0121". Where a match to a canonical token occurs, the canonical token replaces the original token. (d) The newly generated city string by concatenating the updated tokens is matched against a second database, taking length limitations specified by open loop standards into consideration. The result of these techniques is that the merchant location information is mapped to a geographical region.

The computing server then matches the merchant geographical region with the cardholder geographical region, if both exist. An example of comparing two geographical regions is as follows: (a) compute distance between the two region centers by: ARCCOS [SIN(LAT1)*SIN(LAT2)+COS (LAT1)*COS(LAT2)*COS(LONG2−LONG1)]*EARTH_RADIUS_METERS where LAT1, LONG1 are latitude and longitude of region 1 in radians and similarly LAT2 and LONG2 are latitude and longitude of region 2 in radians. EARTH_RADIUS_METERS is hardcoded as 6378137.0. If the distance >=(c1.radiusMeters+c2.radiusMeters), the regions intersect otherwise they do not. It will be apparent to those versed in the art that the above method of location comparison is not limiting to the invention and any equivalent method may be used.

In some embodiments, multiple device locations may exist for a cardholder. If any of the device regions overlaps, then the computing server declares the regions overlap.

BRIEF DESCRIPTION OF THE DRAWINGS

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

The present invention, in accordance with one or more various embodiments, is described in detail with reference to the following figures. The drawings are provided for purposes of illustration only and merely depict exemplary embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

FIG. 1 is a diagram illustrating the existing method for payment card authorization.

FIG. 2 is a diagram illustrating the injection of a computing server, in accordance with an embodiment of the invention.

FIG. 3 is a diagram illustrating the update of device location at the computing server.

FIG. 4 is a diagram illustrating the mapping of a merchant location information to a geographical region.

FIG. 5 is a diagram illustrating the matching of a merchant location to a device location.

FIG. 6 shows the operations of the computing server, in accordance with one embodiment of the invention.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Broadly, embodiments of the present invention are directed towards applying cardholder context and payment card preferences during transaction authorization. Information regarding payment card preference and context may be received a priori or in real-time, and the cardholder context and payment card preferences are applied in-line in real-time during transaction authorization.

In one embodiment, cardholder context may include all contemporaneous information regarding the cardholder such as whereabouts, reachability, and activity, without limitation. Examples of such context include the geographical location (e.g. latitude, longitude) of the card holder, the current country, state, city, postal code of the card holder, cardholder's country of location, the ability to communicate with the card holder on different channels such as SMS, phone, application, email, etc., information on whether the cardholder is conducting a transaction, the type of transaction the cardholder is conducting, etc. These examples are neither comprehensive nor limiting.

In one embodiment, cardholder context may include historical information regarding the cardholder's purchase behavior. Examples of such context include amount and number of transactions in different time periods for different transaction types, merchant types, specific merchants, etc. These examples are neither comprehensive nor limiting.

In one embodiment, cardholder preferences may include rules that the cardholder can set up regarding the authorization or post-processing of transaction, without limitation.

In one embodiment, cardholder preferences may include specific locations to be authorized or denied. Location can be specified relative to the cardholder, such as the vicinity of the cardholder, or in absolute geographical regions such as countries, states, cities, postal codes, or arbitrary regions on a map, or any combinations thereof, without limitation.

In one embodiment, cardholder preferences may include specific transaction types such as e-commerce or ATM transactions to be authorized or denied, cash-back purchases to be authorized or denied, or any combinations thereof, without limitation.

In one embodiment, cardholder preferences may include transactions at certain merchant types such as grocery or fuel to be authorized or denied, transaction at certain merchants to be authorized or denied, transaction at certain point-of-sale terminals to be authorized or denied, or any combinations thereof, without limitation.

In one embodiment, cardholder preferences may include threshold amounts for individual transactions, aggregate spending within specified time periods, number of transactions within specified time periods, or any combinations thereof, without limitation.

In one embodiment, cardholder preferences may include comparison to past spending behavior, for example not to exceed spending in specified transaction categories or merchant categories or amounts, relative to spending behavior in previous months, or any combinations thereof, without limitation.

Examples described above can be used individually or in combination. Examples described above are illustrative and are neither comprehensive nor limiting.

Cardholder preferences allow a cardholder to establish authorization preferences based on at least one property/characteristic of the transaction. Further examples of cardholder preferences include transactions to be authorized only if cardholder is in proximity of the merchant, transactions to be authorized only if cardholder is in certain geographical region, time zone or country, etc. Further examples include application of pre-determined preferences of the cardholder or real-time communication with the cardholder to obtain cardholder preferences prior to the authorization or denial of transaction. Such examples allow a cardholder to establish authorization preferences based on at least one property of the transaction and one or more elements of cardholder context, that are obtained independent of the transaction processing. These examples are neither comprehensive nor limiting.

One embodiment of the present invention is described in detail. This embodiment relates to applying location context and location preferences, as instances and non-limiting examples of cardholder context and preferences, during transaction authorization.

FIG. 1 illustrates an open loop transaction processing system. There are at least five entities involved in such a transaction processing system: a cardholder 101 who presents the payment card credentials to make a purchase; a merchant 102 who accepts the payment card transaction in exchange of goods; a merchant or acquiring processor 103 that processes the payment transaction on behalf of the merchant; a card network 104 that connects the acquiring and issuing processors and validates the integrity of the transaction; and an issuer processor 105 that authorizes the transaction on behalf of the cardholder. Typically, the acquirer processor 103 generates the transaction authorization request and the issuer processor 105 authorizes or denies the transaction authorization request in its response.

There are typically, but not always, three separate phases in a payment card transaction: authorization, clearing, and settlement. These phases are presented as illustration and are not required to all be present for the invention.

Authorization is usually a real-time process, where a merchant gets authorization from the issuer processor for the transaction amount. Authorization may include an authorization message flow.

Clearing is either a real-time or offline process, where the merchant requests the actual transaction value (which may be different from the authorization request) and the amounts are appropriately adjusted in the merchant and card holder's accounts.

Settlement is an after-the-fact process that involves the actual transfer of funds and allocation of fees to each of the parties involved in facilitating the transaction.

FIG. 1 shows an authorization message flow, in accordance with one embodiment of the invention. Referring to FIG. 1, the card holder 101 presents payment card credentials to a merchant 102, e.g. at the merchant's point of sale, for example by manual entry, or by card swipe in a card reader, or online entry, or a variety of other means. This step is indicated by the arrow 111.

The merchant 102 initiates an authorization request/handshake with the acquirer processor 103 as indicated by arrow 112. In one embodiment, the authorization request may be based on one of the existing standards for payment card processing (such as ISO 8583). In another embodiment, the authorization request may be based on a private application programming interface that is understood by the merchant point of sale and the acquirer processor 103.

The acquirer processor 103 initiates an authorization message (indicated by arrow 113) using a standard that is understood by the acquirer processor 103 and the card network 104, for example the ISO 8583 standard, which includes a x100 or a x200 message type, with the card number, card credentials, merchant information, transaction amount, and other mandatory and optional fields as required by the ISO 8583 standard.

The card network 104 does validity checks on the message, invokes any additional services that the acquirer or issuer have signed up for (such as address validation, pin validation, risk scoring, etc.), and then forwards (as indicated by arrow 114) the authorization message to the issuer processor 105.

The issuer processor 105 does validity checks on the message, invokes value-added services such as risk scoring, cardholder policy checks, etc., and checks if the card holder 101 has adequate funds to satisfy the transaction request. This step may require the issuer processor 105 to check its local databases or to initiate a real-time communication with the card holder's core banking system to obtain funds availability validation.

The issuer processor 105 responds to the transaction authorization message with a transaction authorization response message containing an approve/deny and a reason code. This step is indicated by the arrow 115 in FIG. 1.

The card network 104 forwards the transaction authorization response message to the acquirer processor 103 as indicated by the arrow 116.

The acquirer processor 103 completes the authorization handshake by sending the transaction authorization response message to the merchant 102 as indicated by the arrow 117.

The merchant 102 presents the transaction authorization response message to the card holder 101 as indicated by the arrow 118. Messages 111 to 118 in FIG. 1 define a transaction authorization path.

FIG. 1 shows a simple success case, and not the myriad complex use cases involving message loss, retries, timeouts, stand-in processing, etc.

Based on some embodiments of the ISO 8583 protocol, the transaction request message (×100 or ×200) may include information required to determine a characterization of the transaction, including but not restricted to, the card number, transaction type (e.g. in-store, e-commerce, bill pay, mail order, etc.), merchant identifier, merchant type, merchant location, and transaction amount.

Based other embodiments of the ISO 8583 protocol, the transaction response message (×110 or ×210) may include information required to complete a characterization of the transaction, including but not restricted to, the authorization status, the denial reason (if transaction is denied), the approval and approval amount.

FIG. 2 illustrates an authorization message flow, in accordance with another embodiment. The authorization message flow is similar to the authorization message flow of FIG. 1, save for an introduction of cardholder context and preferences into the transaction authorization process. Components 201-205 in FIG. 2 correspond to components 101-105 in FIG. 1.

Additionally, component 206 is a computing server that interfaces with the payment network on one side and a user device 207 on the other.

For illustrative purposes, computing server 206 is shown as interfacing with an issuer processor 205. However, those familiar with the art will recognize that computing server 206 could also interface with the card network 204 or even a financial institution, so long as it is in the transaction authorization path defined by messages 211, 212, 213, 214, 217, 218, 219, and 220, which correspond to messages 111 to 118 in FIG. 1.

Independent of the transaction authorization path defined by messages 211, 212, 213, 214, 217, 218, 219, and 220, the user device 207 and computing server 206 exchange information (231, 232), with the result that computing server 206 obtains cardholder contextual information and cardholder preferences.

User device 207 need not be bound to a specific user, nor does a specific user need to be bound to a user device 207. The device-to-user binding may not be static or one to one. Thus, a user may select one or more devices, or a device may be selected by one or more users. Indeed, a user may be allowed to select and unselect devices at any time.

Further, while location context is used as an example of cardholder context, it will be apparent that this is illustrative and not limiting to the types of cardholder context that can be communicated between components 206 and 207.

During a authorization message flow, upon receipt of authorization message 214, in one embodiment of the invention, issuer processor 205 may retrieve cardholder context and payment card preferences from computing server 206, either for the purpose of affecting the outcome of the authorization or for additional information related to pre/in/or post transaction processing.

During an authorization message flow, upon receipt of authorization message 214, in another embodiment of the invention, issuer processor 205 may present the authorization message and receive the outcome of the application of cardholder context and user preferences on the authorization message 214 from computing server 206. This information may be used either for the purpose of affecting the outcome of the authorization or for additional information related to pre/in/or post transaction processing.

In one embodiment, if the cardholder context and the transaction context do not match, instead of denying the transaction, a message may be sent to the cardholder to verify his/her location. If the cardholder does not verify his/her location within a predefined time (say 30 seconds) then the transaction is denied. In another embodiment, the transaction may be kept in abeyance for a longer time pending confirmation of the cardholder location. The latter case is particularly useful for transactions with ACH clearing.

FIG. 3 describes one example of cardholder context in the form of user/device location. As described above, cardholder context is updated from the user device 207 to the computing server 206 in a manner that is independent of the transaction authorization process. A user may designate one or more devices for sending location updates.

The example described below and in FIG. 3 shows one instance of the location update mechanism, in accordance with one embodiment.

A user device 207 may send updates under three scenarios (i) if there has been no update for a configured time period, (ii) if there has been a significant location change, or (iii) if the device has exited one of set of configured regions.

In one embodiment, a significant location update is initiated when a user device 207 has (i) been turned on, (ii) changed cellular base stations in a cellular network, (iii) changed access points in a wireless LAN, (iv) received a manual update prompt from user, or (v) received a request for update from application, for example when preferences are changed by the user. When a significant location update event happens, the device determines its current location using one or more mechanisms, for example GPS, cellular triangulation, Wi-Fi triangulation, etc.

Once the device has determined its location, it determines whether to send this location update to the computing server 206. In one embodiment, if the location has insufficient accuracy, e.g. specified as an accuracy to within a certain distance, say 100 m, as reported by location hardware or (if the location is within a configured distance of the previous location update delivered to computing server 206 and the location is within a configured time of the previous location update delivered to server) then this location is not sent. Otherwise the location update is sent to computing server 206, and a new region is added to monitored regions as part of a region monitoring process. In one embodiment, the new region may be bounded by configured minimum and maximum ranges, and may be a function of the current speed of the user/device. One example of a region includes a circle with center=[current latitude, current longitude], and radius=max{MIN_RANGE, min{MAX_RANGE, speed*NOMINAL_PERIOD}}.

In one embodiment, a region update event occurs when a user device 207 exits one of the monitored regions maintained in a memory of the user device 207. When a region update event occurs, (i) the current location is sent to the computing server 206, (ii) all currently monitored regions are deleted, and (iii) a new region is created for monitoring, e.g. as a circle with center=[current latitude, current longitude], and radius=max{MIN_RANGE, min{MAX_RANGE, speed*NOMINAL_PERIOD}}.

In FIG. 3, a user starts in cell 1 which defines a service area for a cell tower or base station 301. A first location update, e.g. generated due to significant location update/change to location 311, is initiated by the user device 207 to transmit the location 311 to the computing server 206, and a new region 321 is created in a list of monitored regions.

If the user moves to a location 312, thereby exiting the region 321, the user device 207 transmits the location 312 to the computing server 206, the region 321 is deleted from the list of monitored regions, and a new region 322 is registered/created for monitoring as explained above.

If the user now moves to a new location 313, such a move would correspond to a significant location update. This is because the user is no longer communicating with the cell tower 301 having been handed off to a new cell tower 302. The service area for the cell tower or base station 302 in indicated by the circle marked cell 2 in FIG. 3. Ordinarily, when the user moves to the location 313, the user device 207 would initiate a significant location update, as described above. However, in this case, since the location 313 is sufficiently close to location 312 the location update is not sent to the computing server 206.

If the user moves to a new location 314, exiting the region 322, the user device 207 sends the location 314 to computing server 206, the region 322 is deleted, and a new region 323 is registered for monitoring, as explained above.

If the user moves to a new location 315, thus exiting the region 323, the user device 207 would send the location 315 to the computing server 206, the region 323 is deleted, and a new region 324 is registered for monitoring, as explained above.

In one embodiment, if the user moves to a new location 316, the user device 207 would generate/initiate a significant location update. This update is sent to the computing server 206, for example because the time was greater than a threshold period since last update. At this point, a region 325 is added to the monitored regions, and both regions 324 and 325 would be monitored.

Each new location (e.g. the user moves to a new location 317, thus exiting the region 324, and so on) would be processed as described above.

In FIG. 3, the diameters of the circles are different, to illustrate that the diameter of each circle is a function of the speed of the user at the point of creation of the region. Thus, for example, in one embodiment, a frequency at which location updates may be reported to the computing server 206 is kept constant by changing the diameter of each region 324 based on the speed of the user. Essentially the higher the speed, the bigger the diameter.

A card present transaction may have the following location-related fields: postal code, city, state, country. If postal code is available, [postal code, country] location key is generated. If city and/or state are available, [city, state, country] location key is generated.

In one embodiment, if location information in the form of a postal code and a country location is available, then the combination of postal code and country location is used a search key to search a location database comprising entries that map each combination of [postal code, country] to a particular geo-location region. If there is a match, the geo location region for the particular [postal code, country] is returned.

In one embodiment, if there is no match or there is no [postal code, country], then [city, state, country] is matched against a database that contains [city, state, country] entries. While there are ISO standards for state and country labels, there are no mandatory rules for city names. One embodiment for matching city names is described below:

(a) If there is a match for [city, state, country], the corresponding region is used;

else, [NULL, state, country] is matched against the database (i.e. state level match;

If the latter also fails, [NULL, NULL, country] is matched against the database (i.e. country level match); A match returns the corresponding geo-location;

If all matches fail, the location preference match is aborted for lack of information.

FIG. 4 illustrates one part of a sample matching algorithm for mapping a city name in a transaction to a geo-location, in accordance with one embodiment. Referring to FIG. 4, reference numeral 401 indicates a regions table, reference numeral 404 indicates a region aliases table, and reference numeral 403 indicates a tokenized regions table.

The regions table 401 contains entries that include the commonly used city name for a location; and the latitude and longitude for that location.

The region aliases table 402 contains entries that include common variations for names mapped to an associated alias. For example, "north", "n", and "no" all map to alias "!0121".

The tokenized regions table 403 contains entries that include the city name from the regions table, with common name variations replaced by the corresponding aliases. Aliases have a pre-defined grammar, for example !NNNN in FIG. 4, (402, 403). The character ! in the grammar denotes that NNNN is an alias, e.g. 0121 and not a number in a city name, A city name may be limited to a maximum field length. In one embodiment, if the incoming transaction authorization has maximum length city name after trimming/eliminating leading and trailing spaces, a variable "max" is set to 1. The input city name is converted to lowercase and trimmed of leading and trailing spaces. This in indicated by step 411 in FIG. 4, where the input city name "North Ridge Point" which has a trailing space and is 18 characters long is converted to the 17 character string "north ridge point" by elimination of the trailing space and conversion of the uppercase letters to lowercase.

If there is a match in the tokenized regions table 403, the corresponding city name is returned as indicated by the step 412. The match may be a full match if max=0 or a prefix match for the maximum length if max=1.

In one embodiment, if there is no match in the tokenized regions table 403, then block 413 executes. At block 413, the city is tokenized into alphanumeric tokens, and each token is converted to an alias if it matches the region aliases table 402. A converted string, consisting of a concatenation of the tokens or their aliases (where available) is then created.

The converted string is matched against the tokenized regions table 403. If there is a match, the corresponding region is returned at 414. Otherwise, the match fails, and a [NULL, state, country] search is initiated.

FIG. 5 describes one embodiment of user location context matching. Referring to FIG. 5, at 501, an incoming transaction is first assessed for whether a specific context and preference, e.g. location, can be applied for this transaction. For example, a preference such as "user device must be in the vicinity of the merchant" is applicable for a card-present or customer-present transaction but not for an online transaction.

If the cardholder context and preference is applicable, the next check at 502 is to assess whether updated cardholder context, e.g. location, is available.

If cardholder context is available and the preference is set, then the next check at 503 is to assess whether the transaction has the necessary information to apply context and preference. As an example. Location context and preference checks are described below.

At block 503 a check is performed to determine if [postal code, country] mapping is available.

If the [postal code, country] mapping fails, the next check at 504 is to assess if [city, state, country] match is successful. This check includes the mapping of city as described in FIG. 4.

If the [city, state, country] match fails, next check at 505 is to assess if [state, country] match is successful.

If the [state, country] match fails, then the next check at block 506 is to assess if [country] match is successful.

If any of the above checks results in a region, the next check at 507 is to match user location context with the merchant region. In one embodiment, two geographical regions may be compared as follows: (a) compute distance between the two region centers by: ARCCOS [SIN(LAT1) *SIN(LAT2)+COS(LAT1)*COS(LAT2)*COS(LONG2− LONG1)]*EARTH_RADIUS_METERS where LAT1, LONG1 are latitude and longitude of region 1 in radians and similarly LAT2 and LONG2 are latitude and longitude of region 2 in radians. EARTH_RADIUS_METERS is hard-coded as 6378137.0. If the distance <=(c1.radiusMeters+ c2.radiusMeters), the regions intersect otherwise they do not.

For each context and preference, there are 6 possible outcomes: (i) user is not provisioned, (ii) user is provisioned in system but has not enabled the preference, (iii) context and preference is not applicable for this transaction, (iv) preference failed, (v) preference could not be applied for lack of information or context, and (vi) preference passed.

FIG. 6 describes an implementation of the computing server 206, in accordance with one embodiment. Referring to FIG. 6, a device context module 601 implements the logic for interacting with the end user devices and updating a database module 602 with cardholder context. A transaction data module 604 implements logic for interacting with the issuer processor, extracting transaction information and returning cardholder context and payment card preference match information. A cardholder context match module 603 implements logic to compare cardholder context to transaction context. A communication module 605 enables with external entities.

In one embodiment, a method for processing a payment authorization request associated with a payment card is disclosed. The method may comprise the following steps:

determining a cardholder's context based on transmissions received from a user device associated with a cardholder using the payment card;

determining a transaction context based on analysis of the payment authorization request;

determining at least one transaction authorization preference associated with the payment card; and performing a transaction authorization process to generate a transaction authorization response based on the at least one transaction authorization preference wherein information in the transaction context is used as a hint to selectively guide application of the transaction authorization preference.

In one embodiment, the hint may be to override a card-present authorization preference if the transaction context indicates that the payment authorization request is in respect of an online transaction.

In one embodiment, the hint may be to override a card-present authorization preference if the transaction context indicates that the payment authorization request was generated in respect of a predefined merchant.

In one embodiment, the predefined merchant may comprise a merchant known to initiate the payment authorization request at a location different from a location indicated by the cardholder's context. For example consider that a UPS agent may swipe a cardholder's card at one location, but my initiate the payment authorization request at another location, say a back office. In this case it does not make sense to apply a cardholder preference that specifies that the cardholder must be present at the location from which the payment authorization request was initiated. Thus, UPS as a merchant may included in a list of predefined merchants in respect of whom to override any card-present authorization preference.

By way of a further example, it is know that while cab drivers swipe a customer's card at one location, the actual payment authorization request is made at a different location at a back office. Thus, cab companies may be included in the list of predefined merchants in respect of whom to override any card-present authorization preference.

In one embodiment, the hint may be to override a card-present authorization preference if the transaction context indicates that the payment authorization request was generated in respect of a predefined transaction type. A recurring transaction is a good example of a predefined transaction type. The reason is for a recurring transaction a cardholder's location will generally not match the location from which a payment authorization request associated with the recurring transaction is made. As an example, consider the case of a cardholder who pays a recurring monthly subscription for a gym membership by credit card. It will be seen that the cardholder's actual location will not always match the location at which a payment authorization request associated with the recurring monthly subscription is made.

In one embodiment, the cardholder context comprises location information for the cardholder.

In one embodiment, determining the transaction context may include determining a merchant location from the transaction authorization request by mapping merchant location information contained therein to a geographical location.

Advantageously, the technology disclosed herein enable a cardholder's context and a transaction authorization preferences set by the cardholder to influence the transaction authorization process.

As used herein, the term "module" might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. After reading this description, it will become apparent to a person skilled in the relevant art how to implement the invention using other computing modules or architectures.

Modules might be implemented using a general-purpose or special-purpose processing engine such as, for example, a microprocessor, controller, or other control logic. In the illustrated example, the modules could be connected to a bus, although any communication medium can be used to facilitate interaction with other components of computing modules or to communicate externally.

The computing server 206 might also include one or more memory modules, simply referred to herein as main memory. For example, preferably random access memory (RAM) or other dynamic memory, might be used for storing information and instructions to be executed by processor. Main memory might also be used for storing temporary variables or other intermediate information during execution of instructions to be executed by processor. Computing module might likewise include a read only memory ("ROM") or other static storage device coupled to bus for storing static information and instructions for processor.

The database module 602 might include, for example, a media drive and a storage unit interface. The media drive might include a drive or other mechanism to support fixed or removable storage media. For example, a hard disk drive, a floppy disk drive, a magnetic tape drive, an optical disk drive, a CD, DVD or Blu-ray drive (R or RW), or other removable or fixed media drive might be provided. Accordingly, storage media might include, for example, a hard disk, a floppy disk, magnetic tape, cartridge, optical disk, a CD, DVD or Blu-ray, or other fixed or removable medium that is read by, written to or accessed by media drive. As these examples illustrate, the storage media can include a computer usable storage medium having stored therein computer software or data.

In alternative embodiments, the database module 602 might include other similar instrumentalities for allowing computer programs or other instructions or data to be loaded into computing module. Such instrumentalities might include, for example, a fixed or removable storage unit and an interface. Examples of such storage units and interfaces can include a program cartridge and cartridge interface, a removable memory (for example, a flash memory or other removable memory module) and memory slot, a PCMCIA slot and card, and other fixed or removable storage units and interfaces that allow software and data to be transferred from the storage unit to computing module.

The communications module 605 might include various communications interfaces such as an Ethernet, network interface card, WiMedia, IEEE 802.XX or other interface), or other communications interface. Data transferred via communications interface might typically be carried on signals, which can be electronic, electromagnetic (which includes optical) or other signals capable of being exchanged by a given communications interface. These signals might be provided to communications interface via a channel. This channel might carry signals and might be implemented using a wired or wireless communication medium. Some examples of a channel might include a phone line, a cellular link, an RF link, an optical link, a network interface, a local or wide area network, and other wired or wireless communications channels.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration

The invention claimed is:

1. A computer-implemented method, in a context correlation server of a data network implemented at least partially in hardware, for correlating merchant context to user preferences for transactions to improve transaction security of an issuer processor device when processing payment authorization requests associated with payment cards, the method comprising:

receiving user preference information for a plurality of users, wherein the user preference information comprises at least rules that: a payment card may only be used if a merchant is within a proximity of the cardholder, limit transaction types, limit transaction amounts, limit payment types, and limit merchant types;

receiving context information updates from user devices in real-time, wherein the context information comprises at least current geo-location information and one other context data relevant to user preferences;

receiving, from the issuer processor making a determination of whether to authorize a specific transaction, a specific payment authorization request from a specific merchant device during the specific transaction, wherein the specific payment authorization includes at least one context data relevant to user preferences, determining a specific cardholder's context based on transmissions received from a specific user device associated with the specific cardholder using the specific payment card;

determining a transaction context of the specific merchant based on parsing network packets associated with the specific payment authorization request, wherein the parsing identifies a location of the specific merchant and at least one other context data, and wherein parsing the specific payment authorization request is based at least in part on the ISO (International Standards Organization) 8583 protocol for data arrangement of at least merchant information within the specific payment authorization request;

applying the specific cardholder's context in view of the user preferences to the transaction context including:

(a) comparing geo-physical coordinates of the specific user device to geo-physical coordinates of the specific merchant device, wherein the specific merchant geo-physical coordinates are determined by mapping merchant city information from the specific payment authorization request to a known city name comprises:

Map the city name to a known database;

and when no mapping match occurs, by generating a set of tokens comprising an alphanumeric substring of the merchant city information identified from the parsing;

replacing any of the set of tokens with a matching canonical token; and matching the newly generated string against a second database of geographical regions; and (b) comparing the at least one other context data;

responsive to a positive comparison of the specific cardholder's context in view of the user preferences to the transaction context of the geo-physical coordinates, approving the specific payment authorization request, wherein the positive comparison is due to an acceptable proximity between the geo-physical coordinates, and a positive comparison of the at least one other context data to at least one user preference, wherein the specific payment authorization is received over the data network; and sending, to the issuer processor, the approval to the specific payment authorization request over the network to the issuer processor device in the authorization determination to the specific merchant device regarding the specific transaction.

2. The method of claim 1, wherein the user preferences for the specific cardholder override a card-present authorization preference if the transaction context indicates that the payment authorization request is in respect of involves an online transaction.

3. The method of claim 1, wherein the user preferences for the specific cardholder override a card-present authorization preference if the transaction context indicates a predefined merchant known to initiate the payment authorization request at a location different from a location indicated by the a cardholder's context.

4. The method of claim 1, wherein the user preferences for the specific cardholder override a card-present authorization preference if the transaction context indicates that the payment authorization request was generated according to a predefined transaction type.

5. The method of claim 4, wherein the predefined transaction type comprises a recurring transaction.

6. The method of 1, wherein the cardholder context comprises location information of the specific cardholder.

7. The method of claim 6, wherein determining the transaction context comprises a step of determining a merchant location from the transaction authorization request by mapping merchant location information contained therein to a geographical location.

8. The method of claim 1, wherein the transmissions from the user device comprise location updates.

9. The method of claim 8, further comprising optimizing at least one criterion based on which the user device sends the location updates.

10. A system, comprising:

a processor; and a memory coupled to the processor, the memory storing instructions which when executed by the processor, causes the system to perform a method for processing a payment authorization request associated with a payment card, comprising:

receiving user preference information for a plurality of users, wherein the user preference information comprises at least rules that: a payment card may only be used if a merchant is within a proximity of the cardholder, limit transaction types, limit transaction amounts, limit payment types, and limit merchant types;

receiving context information updates from user devices in real-time, wherein the context information comprises at least current geo-location information and one other context data relevant to user preferences;

receiving, from the issuer processor making a determination of whether to authorize a specific transaction, a specific payment authorization request from a specific merchant device during the specific transaction, wherein the specific payment authorization includes at least one context data relevant to user preferences, determining a specific cardholder's context based on transmissions received from a specific user device associated with the specific cardholder using the specific payment card;

determining a transaction context of the specific merchant based on parsing network packets associated with the specific payment authorization request, wherein the parsing identifies a location of the specific merchant and at least one other context data, and wherein parsing the specific payment authorization request is based at least in part on the ISO (International Standards Organization) 8583 protocol for data arrangement of at least merchant information within the specific payment authorization request;

applying the specific cardholder's context in view of the user preferences to the transaction context including:

(a) comparing geo-physical coordinates of the specific user device to geo-physical coordinates of the specific merchant device, wherein the specific merchant geo-physical coordinates are determined by mapping merchant city information from the specific payment authorization request to a known city name comprises:

Map the city name to a known database;

and when no mapping match occurrs, by generating a set of tokens comprising an alphanumeric substring of the merchant city information identified from the parsing;

replacing any of the set of tokens with a matching canonical token; and matching the newly generated string against a second database of geographical regions; and (b) comparing the at least one other context data;

responsive to a positive comparison of the specific cardholder's context in view of the user preferences to the transaction context of the geo-physical coordinates, approving the specific payment authorization request, wherein the positive comparison is due to an acceptable proximity between the geo-physical coordinates, and a positive comparison of the at least one other context data to at least one user preference, wherein the specific payment authorization is received over the data network; and sending, to the issuer processor, the approval to the specific payment authorization request over the network to the issuer processor device in the authorization determination to the specific merchant device regarding the specific transaction.

11. The system of claim 10, wherein the user preferences for the specific cardholder override a card-present authorization preference if the transaction context indicates that the payment authorization request involves an online transaction.

12. The system of claim 10, wherein the user preferences for the specific cardholder override a card-present authorization preference if the transaction context indicates that the payment authorization request was generated in respect of a predefined merchant.

13. The system of claim 12, wherein the predefined merchant comprises a merchant known to initiate the payment authorization request at a location different from a location indicated by the cardholder's context.

14. The system of claim 10, wherein the user preferences for the specific cardholder override a card-present authorization preference if the transaction context indicates that the payment authorization request was generated in respect of a predefined transaction type.

15. The system of claim 14, wherein the predefined transaction type comprises a recurring transaction.

16. A non-transitory computer-readable medium having stored thereon a sequence of instructions which when executed by a processor causes a system to perform a method in a context correlation server of a data network, for correlating merchant context to user preferences for transactions as transaction security when processing payment authorization requests associated with payment cards, the method comprising:

receiving user preference information for a plurality of users, wherein the user preference information comprises at least rules that: a payment card may only be used if a merchant is within a proximity of the cardholder, limit transaction types, limit transaction amounts, limit payment types, and limit merchant types;

receiving context information updates from user devices in real-time, wherein the context information comprises at least current geo-location information and one other context data relevant to user preferences;

receiving, from the issuer processor making a determination of whether to authorize a specific transaction, a specific payment authorization request from a specific merchant device during the specific transaction, wherein the specific payment authorization includes at least one context data relevant to user preferences, determining a specific cardholder's context based on transmissions received from a specific user device associated with the specific cardholder using the specific payment card;

determining a transaction context of the specific merchant based on parsing network packets associated with the specific payment authorization request, wherein the parsing identifies a location of the specific merchant and at least one other context data, and wherein parsing the specific payment authorization request is based at least in part on the ISO (International Standards Organization) 8583 protocol for data arrangement of at least merchant information within the specific payment authorization request;

applying the specific cardholder's context in view of the user preferences to the transaction context including:

(a) comparing geo-physical coordinates of the specific user device to geo-physical coordinates of the specific merchant device, wherein the specific merchant geo-physical coordinates are determined by mapping merchant city information from the specific payment authorization request to a known city name comprises:

Map the city name to a known database;

and when no mapping match occurrs, by generating a set of tokens comprising an alphanumeric substring of the merchant city information identified from the parsing;

replacing any of the set of tokens with a matching canonical token; and matching the newly generated string against a second database of geographical regions; and (b) comparing the at least one other context data;

responsive to a positive comparison of the specific cardholder's context in view of the user preferences to the transaction context of the geo-physical coordinates, approving the specific payment authorization request, wherein the positive comparison is due to an acceptable proximity between the geo-physical coordinates, and a positive comparison of the at least one other context data to at least one user preference, wherein the specific payment authorization is received over the data network; and sending, to the issuer processor, the approval to the specific payment authorization request over the network to the issuer processor device in the authorization determination to the specific merchant device regarding the specific transaction.

\* \* \* \* \*